United States Patent [19]
Ohuchi et al.

[11] 3,983,293
[45] Sept. 28, 1976

[54] MOLD FOR FORMING GLASS ARTICLES

[75] Inventors: Keishi Ohuchi, Sagamihara; Kenzo Matsui; Keizo Tamai, both of Yokohama, all of Japan

[73] Assignee: Toyo Kohan Co., Ltd., Tokyo, Japan

[22] Filed: Aug. 6, 1975

[21] Appl. No.: 602,309

[52] U.S. Cl. ............................... 428/306; 249/114; 428/308; 428/309; 428/325; 428/328; 428/332
[51] Int. Cl.² ............................................ B32B 5/30
[58] Field of Search ............ 428/304, 306, 308, 309, 428/325, 328, 329, 330, 332; 249/114

[56] References Cited
UNITED STATES PATENTS 2,169,384  8/1939  Hall .................................... 428/304
3,325,303  6/1967  Lant et al. ......................... 428/325

*Primary Examiner*—William J. Van Balen
*Attorney, Agent, or Firm*—Wenderoth, Lind & Ponack

[57] ABSTRACT

A metal mold for forming glass articles having a porous lining layer having an excellent heat-insulating property and the abrasion resistance at high temperature, porous lining layer being so designed that a suitable amount of water can be contained therein. As the lining material, there are used materials having an excellent heat-insulating property, such as hollow glass powder and diatomaceous earth, and materials having excellent abrasion resistance, such as metal powder and ceramic powder. Mainly a heat-resistant polymeric adhesive is used for lining such material on a metal mold.

6 Claims, 3 Drawing Figures

MOLD FOR FORMING GLASS ARTICLES

BACKGROUND OF THE INVENTION

1. Field of the Invention

This invention relates to a mold for use in rotationally blow-forming glass articles such as glass cups and electric bulbs.

This invention provides a mold having a very long life which can produce well-finished glass articles.

2. Description of the Prior Art

The so-called rotational blow-molding method is generally used for molding glass articles such as glass table ware, electric bulbs and chemical appliances. According to this method, a high-temperature molten and softened glass is blown in a mold by air and the glass or mold is rotated while contacting the glass with the inner face of the mold to thereby obtain an article of a desired form.

High temperature glass to be molded according to this molding process is generally called a glass parison, and it is generally heated at a temperature of about 1,000°C.

The time required for molding one glass article is only about 5 seconds, but since the inner surface of the mold is in frictional contact with the glass parison blown under a pressure of about 0.5 Kg/cm$^2$ during this molding period, a lining should be formed on the inner surface of the mold so that it can resist this frictional contact sufficiently. Further, the inner surface of the mold is wetted with a suitable amount of water so that molded glass can easily be parted from the inner surface of the mold. So-called cork graphite paste molds have heretofore been used generally in this molding process. Molds of this type are prepared by baking cork powder onto the inner surface of a metal mold by using a binder such as linseed oil, and the molds are thus lined with graphitized cork layers, or cork graphite layers.

However, since this cork graphite layer does not have a sufficiently lower coefficient of friction when contacted by the above-mentioned high-temperature glass parison, if the mold is used for about 8 hours, the cork graphite layer wears away and is not usable any more. This short life is one of the shortcomings of the cork graphite past mold. In addition, since it is very difficult to form a uniform cork graphite layer as a mold lining, deviation is readily caused in the quality of glass articles formed by this method and hence, articles having well-finished surfaces cannot be obtained with good consistency.

For overcoming such defects, U.S. Pat. No. 3,254,981 proposes a mold in which the inner face of the mold is lined with a porous metal as a material having a lower coefficient of friction with respect to a glass parison than graphitized cork. According to this proposal, since the glass parison is molded in direct contact with the metal lining, it is abruptly cooled and it may be broken or fine cracks may be formed during the molding step. Therefore, this method cannot be practically carried out.

Further, British Pat. No. 1,084,816 proposes an improved cork graphite paste mold. However, since cork graphite is used as a lining material, a conspicuous improvement in the length of the life of this mold cannot be expected.

OBJECTS OF THE INVENTION

It is therefore a primary object of this invention to provide a mold which has a much longer life than the conventional cork graphite paste mold and which can provide well-finished glass articles superior or at least comparable to products formed by using the conventional cork graphite paste mold.

Another object of this invention is to provide a mold which can be prepared more easily at a lower cost with a better quality reproducibility of molded articles than the conventional cork graphite paste mold.

SUMMARY OF THE INVENTION

The mold of this invention for use in rotationally blow-molding glass articles has a lining layer composed of a porous material having an excellent heat-insulating property and abrasion resistance at high temperatures. Since the lining layer has an excellent heat-insulating property, the glass parison is prevented from being rapidly cooled, and hence, a glass article having a well-finished surface can be obtained. Further, since the lining layer has excellent abrasion resistance, the mold of this invention has a very long life.

The features and effects of this invention will now be described in detail by reference to the accompanying drawings.

DETAILED DESCRIPTION OF THE PRESENTLY PREFERRED EMBODIMENT

Figure 1:
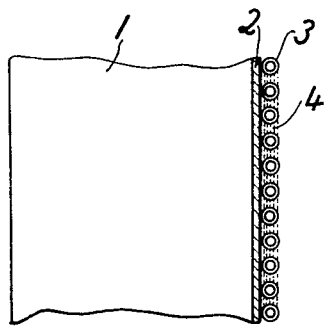
FIG. 1 is an enlarged sectional view of a portion of a mold lined with hollow powder.

This invention has been completed based on novel findings obtained as a result of extensive research on molds for use in rotationally blow-molding glass articles.

Requirements necessary for formation of having a molds of long life and capable of providing well-finished glass articles will first be described. When a mold tending to cool glass rapidly, namely a mold having a high heat conductivity and a poor heat-insulating property, is used for molding glass articles, fine scars or cracks are formed in the resulting glass articles because of the heat stress, or since solidification of the glass parison does not proceed uniformly, various distortions are caused in the resulting product and the appearance is degraded. If a mold having a poor heat-insulating property, for example, a non-lined metal mold, is used for molding, most of the glass parisons will be broken during the molding step because of generation of large cracks. Accordingly, in order to obtain glass articles free of from either surface scars or distortions, namely well-finished glass articles, it is necessary for the mold to have a good heat-insulating property.

We prepared various kinds of molds having differing heat-insulating properties by lining metal molds with various materials while changing the lining thickness, and glass cups were molded by using these molds. Thus, the relation among the heat conductivity of the lining material, the thickness of the lining layer, the finish conditions of the resulting product, namely, mainly the amount of surface scars and the degree of distortions, and the appearance of the product was examined. A great variety of materials ranging from solid materials now known to have a low heat conductivity, for example, paper, felt, foamed urethane, diatomaceous earth, hollow glass powder, rice powder and asbestos, to material having a very high heat conductivity, such as copper powder, copper foil and other metal powders and foils, were used as the lining material.

The lining was performed by coating an epoxy type adhesive thinly on the inner surface of a mold and applying thereto a material such as described above. The finish conditions, namely the appearance conditions, of products formed by using the thus prepared lined molds were evaluated with the naked eye. Products that could be markedly were designated as "passed products," and products that could not be marketed were designated as "rejected products."

From results of the foregoing experiments, we derived the following conclusions:

1. In the case of a material having a heat conductivity higher than 0.005 Joul/cm.sec.°K, however thickly it may be formed as a lining sufficient heat-insulating effect cannot be attained and passed products cannot be formed by using molds having a lining of such material.

2. Even in the case of a material having a heat conductivity not higher than 0.005 Joul/cm.sec.°K, in order to obtain a sufficient heat-insulating property, the lining should have a thickness of at least 40 microns.

3. As the thickness of the lining layer increases, the heat-insulating property is improved and the appearance of the product is improved. However, after the thickness of the lining layer exceeds 3,000 microns, the improved effects are not particularly increased.

4. Solid materials now known to have the lowest heat conductivity give a most preferred heat-insulating property in rotationally blow-molding glass articles. For example, a glass article having a most beautiful appearance can be obtained by using a paper-lined mold.

In short, from the results of the foregoing experiments, we derived the conclusion that in order to impart a sufficient heat-insulating property to a mold for use in rotationally blow-molding glass articles, it is most preferred to line the mold with a material having a heat conductivity not higher than 0.005 Joul/cm.sec.°K in a thickness of 40 to 3,000 microns.

Each of the values of the heat conductivity referred to in the instant specifications is measured at room temperature.

If blow molding is carried out by using a mold lined with a material satisfying the above requirements, glass articles having a well-finished and beautiful appearance can be obtained. However, all of materials satisfying the above requirements do not always have sufficient strength or heat resistance. Accordingly, molds having linings of such materials do not always have a long life. For example, a paper-lined mold can provide a well-finished article having a good appearance, but the lined mold cannot be used to form a good produce once it is used. Accordingly, every time one product is formed, fresh paper must be applied again. Thus, such paper-lined mold has a life of only one molding operation.

With a view to finding materials capable of providing well-finished products having a good appearance and having a sufficiently long life, we further made detailed research on the material and thickness of the lining layer necessary for attaining sufficient durability.

As pointed out hereinbefore, a so-called glass parison at about 1,000°C. is blown against the inner surface of the mold under a pressure of about 0.5 Kg/cm$^2$, and at this point, the glass parison rubs strongly against the inner surface of the mold. Accordingly, what determines the life of the mold is the abrasion resistance at high temperatures of the lining layer formed on the inner surface of the mold. Although the time required for completing one molding operation is only several seconds and the inner surface of the mold is generally wetted with a small amount of water, the inner surface of the mold coming into contact with the glass heated at about 1,000°C. is instantaneously elevated a high temperature such as 300° to 400°C. Accordingly, in order to obtain a mold having a sufficient durability, it is necessary to use as the lining material a material having a melting point higher than 400°C. and exhibiting a considerable strength at high temperatures. With a view to developing molds having a much longer life than conventional cork graphite paste molds, we prepared molds by applying various materials in different thickness and then blow-molded glass cups by using these molds and compared these molds with each other and with cork graphite paste molds with respect to the degree of wearing of the lining layer. As a result, it was found that if metal, glass or ceramic materials having a melting point higher than 400°C. are formed into the lining having a thickness of at least 40 microns, molds having a highly improved abrasion resistance can be obtained. In these experiments, as in the case of the above experiments on the heat-insulating property, a lining layer was formed by applying a powdery material such as discribed above to an adhesive-coated inner surface of a mold. For example, in the case of a mold having a lining layer of aluminum powder having a thickness of 100 microns, no substantial wearing was observed even when the mold was used continuously for 20 hours. In contrast, in the case of a conventional cork graphite paste mold, about 40 percent of the cork graphite layer wore away when the mold was used continuously for about 8 hours.

These experiments were conducted only for finding materials having a good abrasion resistance while disregarding the finish condition and appearance of molded articles. For example, an alumina powder-lined molds has a very high abrasion resistance but since the heat-insulating property of the lining is insufficient, the finish condition of molded articles is inferior. Accordingly, passed products could not be obtained when such alumina powder-lined mold was employed.

As is apparent from the foregoing, in order to obtain a mold which can be used in practice and which has a long life and can provide glass articles having an excellent finish condition, it is necessary to form a lining layer satisfying the requirements derived from the foregoing two types of experiments, namely experiments for determining the heat-insulating property of the lining layer and experiments made on the abrasion resistance of the lining layer.

Water contained in the lining of a mold has a lubricating activity and smooth the rotations of the glass. Further, water has the effect of facilitating parting of the glass from the mold. Accordingly, good results are generally obtained when a suitable amount of water is present on the inner surface portion of the mold. For this purpose, it is preferred that the lining layer have a porous structure.

Tests comprising the forming of blow-molding cups were conducted while changing the amount of water contained in the lining layer of the mold, and from test results it was found that it is preferred that water be present in an amount of 0.10 to 10 g/dm$^2$. When the amount of water is smaller than 0.10 g/dm$^2$, insufficient lubricating activity is obtained, and when the amount of water is larger than 10 g/dm$^2$, the glass parison is cooled rapidly by the cooling action of the water, and hence, the glass is readily broken during the molding step.

This preferred amount of water was determined as a result of experiments made on various lining materials. It was found that the above preferred amount of water should be present regardless of the kind of lining material. The method for forming a lining of powdery materials on adhesive-coated inner surfaces of metal molds will be apparent for Examples given hereinafter.

In order to blow-mold well-finished glass articles having a beautiful appearance, it is preferred to form the lining of a material having a heat conductivity not higher than 0.005 Joul/cm.sec.°K in a thickness of 40 to 3,000 microns, and in order to obtain a mold having a higher abrasion resistance than a conventional cork graphite paste mold, it is preferred to use a metallic, glass or ceramic material having a melting point higher than 400°C. in a thickness of at least 40 microns. In order to perform the blow molding smoothly, it is preferred that the lining layer have a porous structure such that it can contain water in an amount of 0.10 to 10 g/dm$^2$.

In accordance with this invention, there is provided a mold which can satisfy all of the foregoing requirements and can mold well-finished glass articles.

More specifically, in accordance with the first aspect of this invention, there is provided a mold having a lining layer of a porous structure composed of a glass or ceramic material having a melting point higher than 400°C., said lining layer having a heat conductivity not higher than 0.005 Joul/cm.sec.°K.

Since this mold has an excellent heat-insulating property and abrasion resistance, it can mold well-finished glass articles and has a very long life. This mold can be prepared, for example, by forming hollow glass powder having a melting point higher than 400°C. lining on a metal mold. A section of this mold is shown in an enlarged sectional view in FIG. 1.

Commercially available hollow glass powder has a specific gravity not exceeding 0.5 and a heat conductivity of about 0.0006 Joul/cm.sec.°K.

Referring to FIG. 1, a heat-resistant resinous adhesive 2 such as an epoxy type adhesive is thinly coated on the inner surface of a metal mold 1, and hollow glass powder is scattered on the adhesive coating to bond it to the adhesive coating. Excess powder is brushed off, and the adhesive is then set. Thus, a porous layer 3 composed of the adhered powder is formed as a lining on the inner surface of the metal mold. Since this powder layer has a structure in which powder particles are loosely deposited, a number of small spaces are formed among the particles and the powder layer is given a porous structure. Water 4 can be contained in these small spaces. As the particle size of the powder applied is increased, the porosity ratio of the spaces of the porous layer to the volume of the porous layer when it is presumed that all the spaces of the porous layer are filled) is increased. Further, as the thickness of the porous layer is increased, the amounts of the spaces or pores are increased and in turn the amount of water which can be contained is increased.

Figure 2:
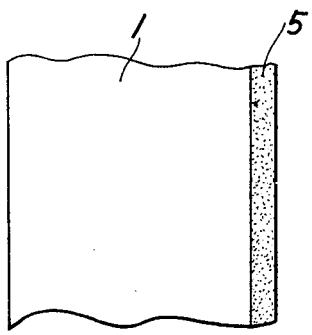
FIG. 2 is an enlarged sectional view of a portion of a mold lined with a porous enamel substance.

A mold having a lining layer of a porous structure having a heat conductivity not higher than 0.005 Joul/cm.sec.°K and being composed of a glass or ceramic material having a melting point higher than 400°C. can also be prepared by forming a porous enamel layer on a metal mold. This mold has a section as shown in an enlarged sectional view in FIG. 2.

A foaming agent such as titanium hydride is added to a commercially available pasty enamel, and the mixture is coated on the inner surface of a metal mold. When the coated mold is heated, the enamel layer is formed as a lining on the inner surface of the mold and simultaneously, the enamel layer is made porous by the foaming action of the titanium hydride to form a porous enamel layer 5.

Similar molds can also be prepared by selecting an appropriate liner-constituting material having a relatively high strength, excellent heat resistance and heat-insulating property.

The intended effects can be enhanced by forming two or more lining layers.

Metallic materials having a heat conductivity not higher than 0.005 Joul/cm.sec.°K are not practically available other than in the form of hollow metal powders. It is possible to produce hollow metal powders, but they are not marketed broadly. Accordingly, they cannot readily be obtained and use of such hollow metal powders is inconvenient.

When the thickness of the thus formed lining layer is too smal, the strength is low and the heat-insulating property is insufficient. Therefore, it is preferred that the thickness of the lining layer be at least 40 microns. However, even if the thickness is increased beyond a certain limit, no particular improvement of the heat-insulating property can be obtained and too large a thickness is useless and wasteful. Accordingly, it is preferred that the thickness of the lining layer be 3,000 microns or smaller.

As pointed out hereinbefore, good results are obtained when the lining layer has a porous structure and water is contained in the lining layer. In general, it is preferred that the porosity of the lining layer by 30 to 70 percent. If the porosity is lower than 30 percent, there is a danger that the amount of water contained in the lining layer is smaller than 0.10 g/dm$^2$ when the thickness of the lining layer is small. When the porosity of the lining layer exceeds 70 percent, the amount of water contained in the lining layer often exceeds 10 g/dm$^2$ when the thickness of the lining layer is large.

In case hollow glass powder used for lining, if the particle size of the powder is too large, there are formed large convexities and concavities on the surface of the lining layer, and this irregular surface is transferred to the glass surface during the molding step so as to degrade the appearance of the molded glass article. Accordingly, it is preferred that the particle size of hollow powder used for the lining be no larger than 200 microns.

In accordance with another aspect of this invention, there is provided a mold comprising a heat-insulating layer formed on the inner surface of a metal mold and a porous layer laminated on said heat-insulating layer, said porous layer being composed of a metallic, glass, or ceramic material having a melting point higher than 400°C. The mold according to this aspect of the invention has a section as shown in an enlarged sectional view in FIG. 3.

Figure 3:
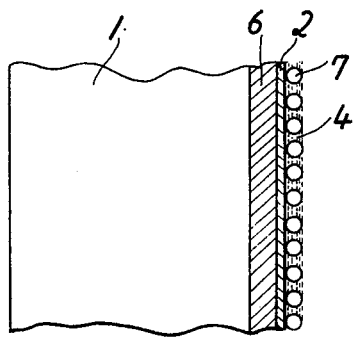
FIG. 3 is an enlarged sectional view of a portion of a mold formed by lining the mold with a heat-insulating layer and laminating thereon a porous layer having excellent abrasion resistance.

Referring to FIG. 3, a porous layer 7 is laminated on a heat-insulating layer 6. In a mold of the type shown in FIG. 3, in addition to an excellent heat-insulating property, a life much longer than that of a conventional cork graphite paste mold can be attained, becuase the porous layer 7 laminated on the heat-insulating layer 6 has an especially good in the abrasion resistance. It is preferred that the heat-insulating layer be formed by using for the lining a material having a heat conductivity not higher than 0.005 Joul/cm.sec.°K in a thickness of 40 to 3,000 microns.

Formation of such a heat-insulating lining layer can easily be accomplished, for example, by mixing a heat-insulating material such as diatomaceous earth with a heat-resistant resin and coating the mixture on the inner surface of a metal mold.

Lamination of the porous layer 7 having an excellent abrasion resistance on the heat-insulating layer can easily be accomplished, for example, by coating a heat-resistant adhesive on the heat-insulating layer 6 and applying a metal powder or the like having a melting point higher than 400°C. to the adhesive coating to form the lining of the metal powder or the like. The lining operation is conducted in the same manner as described above with respect to formation of the lining of hollow glass powder in the mold according to the first aspect of this invention.

When the particle size of the powder is too large, the surface of the lining layer has large convexities and concavities and this irregular surface is transferred to the glass article to degrade the appearance thereof. Accordingly, it is preferred that the particle size of the powder used for the lining be not larger than 200 microns. As the metal powder, there can be employed, for example, aluminum alloy powder, copper alloy powder, iron alloy powder and the like. In addition, glass powder and alumina powder can be used. Further, a porous layer 7 having an excellent abrasion resistance can be formed by laminating on the heat-insulating layer 6 a porous sintered material such as a porous sintered metal and a porous sintered ceramic material.

In general, most of materials having a good heat-insulating property have insufficient strength and heat resistance. In contrast, most of materials having good strength and heat resistance and having excellent abrasion resistance are inferior with respect to the heat-insulating property.

In the mold of this invention, since there is formed a composite lining layer comprising a heat-insulating layer 6 having a satisfactory heat-insulating property and a porous layer 7 having a satisfactory abrasion resistance, said two layers being formed independently, linear-constituting materials can be chosen freely within broad ranges. More specifically, the material constituting the heat-insulating layer 6 should possess a good heat-insulating property and it is not required to have the high abrasion resistance. In contrast, a material constituting the porous layer 7 laminated on the heat-insulating layer should have an excellent abrasion resistance and it need not have a good heat-insulating property. In view of this freedom in selection of liner-constituting materials, it is seen that the mold of this invention has a great practical utility.

When the thickness of the porous layer 7 laminated on the heat-insulating layer 6 is too small, insufficient strength is obtained. Accordingly, it is preferred that the thickness of the porous layer 7 be at least 40 microns. However, if the thickness of the porous layer 7 is too great, since a large quantity of the heat retained by the glass parison is absorbed in the porous layer 7 very rapidly, the glass parison is cooled too rapidly and no well-finished condition can be attained in the product.

When molds were prepared by changing the thickness of the porous layer 7 and the influences of the thickness of the porous layer on the quality of molded glass articles were examined in detail, it was found that the thickness of the porous layer 7 should not exceed 1,000 microns.

If a material having a low heat conductivity is used as the material constituting the porous layer, no particular disadvantage is brought about even when the thickness of the porous layer exceeds 1,000 microns. However, in this case, the materials which can be used are limited, and the thickness need not be increased so much. If the thickness of the porous layer 7 does not exceed 1,000 microns, any material from among glass materials, ceramic materials, aluminum alloys, copper alloys and most other metallic materials can be freely used for formation of the porous layer 7.

For the reasons set forth hereinabove with respect to the mold having a lining layer of hollow glass powder, it is preferred that the porosity of the porous layer be between 30 and 70 percent.

When the above-described described molds of this invention are used for rotationally blow-molding glass articles, there can easily be produced well-finished glass articles having a beautiful appearance with good reproducibility, and furthermore, the molds of this invention have a life much longer than conventional cork graphite paste molds.

Features and effects of this invention will now be described in detail by reference to the following Examples that by no means limit the scope of this invention.

EXAMPLE 1

An epoxy type adhesive was coated on the inner surface of a cast iron mold in a thickness of about 100 microns, and commercially available hollow glass powder having a particle size of about 40 microns was sprinkled on the coating to bond the hollow glass powder to the adhesive coating. Thus, a thin hollow glass powder layer having a thickness of about 100 microns was formed. In this hollow glass powder layer, there were present a great number of spaces among the particles of the powder, and the layer had a porous structure such that about 0.17 g/dm$^2$ of water could be contained in the layer. Fifty such lined molds according to this invention were prepared. Glass cups having a thickness of 1.5 mm, an inner diameter of 50 mm and a height of 100 mm were rotationally blow-molded by using these molds. Each of the thus prepared cups had a well-finished appearance. In the case of each of these molds, the molding could be conducted continuously for 17 hours. For comparison, the molding was conducted under the same conditions while using fifty conventional cork graphite paste molds. A great deviation in useful life was observed for these conventional molds, the shortest life being about 5 hours and the longest life being about 9 hours. On the average, the conventional molds were found to have a life of about 7 hours. From these experimental results, it is seen that the life of the glass molding mold of this invention is improved by 100 percent or more over the conventional cork graphite paste and the deviation of the life among individual molds is greatly reduced by this invention.

EXAMPLE 2

Hollow glass powder was coated on the inner surface of a cast iron mold in the same manner as described in Example 1, and an epoxy type adhesive was coated in a thickness of about 100 microns on the thus formed lining layer. Then, commercially available hollow glass powder having a particle size of about 40 microns was sprinkled on the adhesive layer so that the lining was constituted by two hollow glass powder layers. When glass molds were molded continuously by using the thus prepared cups in the same manner as described in Example 1, it was found that the mold had a life of about 20 hours.

EXAMPLE 3

Commercially available enamel powder was mixed with water to form an enamel slip having a specific gravity of 1.48, and titanium hydride of about 350 mesh as a foaming agent was uniformly mixed with this enamel slip in an amount of about 70 g per 100 cm$^3$ of the slip. The titanium hydride-containing slip was coated in a thickness of 0.5 mm on the inner surface of a cast iron mold, and the coated mold was heated at about 800°C. to effect foaming and form a porous enamel layer. When molding of glass cups was conducted by using the thus formed mold in the same manner as described in Example 1, the molding could be conducted continuously for about 30 hours and well-finished glass cups were obtained.

EXAMPLE 4

Diatomaceous earth was incorporated as a heat-insulating material in an amount of 50 percent by volume into the enamel slip used in Example 3. Using the resulting slip, a porous enamel layer was formed on the inner surface of a cast iron mold in the same manner as described in Example 3. When glass cups were molded by using the thus prepared mold, it was found that the mold had a life of 20 hours. The appearance of the molded product was more beautiful and well-finished than that of the molded product obtained in Example 3.

EXAMPLE 5

In the same manner as described in Example 3, a porous enamel lining layer was formed on the inner surface of a cast iron mold. An epoxy type adhesive was coated on the porous enamel layer in a thickness of about 100 microns, and hollow glass powder was applied on the adhesive coating in the same manner as described in Example 1. Molding of glass cups was conducted in the same manner as described in Example 1. The molding could be conducted continuously for about 50 hours, and well-finished glass cups were obtained.

EXAMPLE 6

Diatomaceous earth powder having a particle size of about 10 microns was incorporated in an amount of about 50 percent by volume into an epoxy resin, and the mixture was coated in a thickness of about 100 microns on the inner surface of a cast iron mold to form an inner lining layer having an excellent heat-insulating property. An epoxy-phenol type adhesive was coated in a thickness of about 100 microns on the thus formed heat-insulating layer, and alumina powder having a particle size of about 40 microns was sprinkled on the adhesive coating to bond the powder to the adhesive and form a thin alumina powder layer having a thickness of about 100 microns. The thus formed alumina powder layer had a great number of spaces among the alumina powder particles, and about 0.15 g/dm$^2$ of water could be contained in these spaces. The adhesive was set by application of heat to reinforce the lining layer, and molding of glass cups was carried out in the same manner as in Example 1 by providing water on the inner surface of the mold. Well-finished glass cups were continuously molded over a period of about 20 hours.

EXAMPLE 7

In the same manner as described in Example 6, a heat-insulating layer having a thickness of about 0.5 mm was formed on the inner surface of a cast iron mold by using a mixture of an epoxy resin with 50 percent by volume of diatomaceous earth powder having a particle size of about 10 microns. The mold used was of the particle type. Each of the parts of the mold had a semi-cylindrical form having an inner diameter of 55 mm and a height of 100 mm, and the inner diameter after lining with the heat-insulating layer was 54 mm. An epoxy type adhesive was coated in a thickness of 100 microns on the heat-insulating layer, and sintered porous copper of a semicylindrical form having an outer diameter of 54 mm, an inner diameter of 40 mm and a height of 100 mm was bonded to the adhesive coating. Then, the sintered porous copper was mechanically cut so that the inner diameter was 53 mm, namely the thickness of the sintered porous copper was 0.5 mm. The sintered porous copper used in this Example was prepared according to a customary method for the production of porous metals by sintering copper powder having a particle size of about 40 microns at a temperature of about 900°C. The sintered porous copper had a porosity of about 50 percent.

Thus was prepared a mold comprising a heat-insulating lining layer and a thin layer of sintered porous copper having a thickness of 0.5 mm, which was laminated on the heat-insulating layer. Glass cups having an inner diameter of 50 mm, a thickness of 1.5 mm and a height of 100 mm were rotationally blow-molded in the same manner as described in Example 1 by using the thus prepared mold. Well-finished and beautiful glass cups could be continuously molded over a period of about 200 hours.

It should be noted that the mold of this invention can be used not only for rotational blow molding but also for all of other methods of molding glass articles.

What is claimed is:

1. A mold for use is molding glass articles which comprises a porous layer lining on the inner surface of a metal mold, said porous layer being composed of a glass or ceramic material having a melting point higher than 400°C. and said porous layer having a heat conductivity not higher than 0.005 Joul/cm.sec.°K as measured at room temperature, a thickness of 40 to 3,000 microns and a porosity of 30 to 70 percent.

2. A mold as set forth in claim 1 wherein the porous layer is composed of hollow glass powder having a particle size not exceeding 200 microns.

3. A mold as set forth in claim 1 wherein the porous layer is composed of a porous enamel.

4. A mold for use in molding glass articles which comprises a heat-insulating layer lining on the inner surface of a metal mold, said heat-insulating layer having a heat conductivity not higher than 0.005 Joul/cm.sec.°K as measured at room temperature and a thickness of 40 to 3,000 $\mu$, and a porous layer laminated on said heat-insulating layer, said porous layer being composed of a metallic, glass or ceramic material having a melting point higher than 400°C. and said porous layer having a thickness of 40 to 1,000 microns and a porosity of 30 to 70 percent.

5. A mold as set forth in claim 4 wherein the laminated porous layer is composed of powder having a particle size not exceeding 200 microns.

6. A mold as set forth in claim 4 wherein the laminated porous layer is composed of a porous sintered metal or a porous sintered ceramic material.

* * * * *